United States Patent [19]

Sakamoto

[11] Patent Number: 4,626,203

[45] Date of Patent: Dec. 2, 1986

[54] FURNACE

[75] Inventor: Hidesato Sakamoto, Nagareyama, Japan

[73] Assignee: Furnace Juko Kabushiki Kaisha, Saitama, Japan

[21] Appl. No.: 782,857

[22] Filed: Oct. 2, 1985

[30] Foreign Application Priority Data

Oct. 11, 1984 [JP] Japan ................................ 59-212993

[51] Int. Cl.[4] ............................ F27B 9/16; F27B 9/00; B65G 25/00; F27D 3/00

[52] U.S. Cl. .................................... 432/138; 414/152; 414/153; 414/180; 432/144; 432/145; 432/239

[58] Field of Search ............... 432/138, 144, 145, 239; 414/152, 153, 180

[56] References Cited

U.S. PATENT DOCUMENTS 1,799,209 4/1931 Bennington ......................... 414/180

2,622,861 12/1952 Talley ................................. 432/239

3,219,327 11/1965 Guingand ............................ 432/138

*Primary Examiner*—John J. Camby

*Attorney, Agent, or Firm*—Jordan and Hamburg

[57] ABSTRACT

Disclosed is a furnace having a furnace chamber formed with a work inlet and a work outlet, and a work mount turntable rotatably provided within the furnace chamber, the furnace further comprising work carry-in means for carrying a work while mounting the work thereon into the furnace chamber through work inlet to transfer the work onto given one of work mount portions on the turntable, and work carry-out means for carrying a work mounted on one of the the work mounts out of the work outlet while mounting the work thereon. Each of the work mounts, the work carry-in means, and the work carry-out means is constituted by a plurality of strip members disposed at regular intervals. The respective strip members of each of the work carry-in means and the work carry-out means are arranged to move up and down passing through the gaps formed between the adjacent strip members of the work mounts. Thus, a work can be mounted onto one of the work mounts by causing the work carry-in means with the work mounted thereon to move down from a position higher than the work mount to a position lower than the same. On the contrary, the work carry-out means can lift a work mounted on one of the mount portions when the work carry-out means comes up from a position lower than the work mount to a position higher than the same.

4 Claims, 11 Drawing Figures

FURNACE

BACKGROUND OF THE INVENTION

1. Field of the Invention

The present invention relates to furnaces for use in heat treatment or the like, such as heat-treat furnaces, heating furnaces, etc., and more particularly, relates to furnaces of this kind in which works to be treated can be efficiently carried into and out of a furnace chamber without being affected by the shape of the works.

2. Description of the Prior Art

Conventionally, three types of furnaces, that is, a convection type, a radiation type, and a conduction type, have been employed, and it has been considered that among these three types, the convection type is a preferred one to treat works at an appropriate temperature. In the convection type of furnace, however, it is difficult to uniformly control the temperature within the furnace because the furnace is arranged such that a burnt gas produced by a burner or the like is blown into the furnace and forcedly convected within the furnace only by the blowing pressure. Consequently, variations easily occur in quality of the treated works, and, on the other hand, there is a limitation in improving the furnace efficiency from the viewpoint of the furnace structure per se.

To overcome the above-mentioned problem, there has been proposed a furnace which comprises a work mounting turntable provided rotatably, and a circulating fan provided coaxially with the turntable to thereby forcedly circulate heated gases within a furnace chamber; as disclosed in Japanese Patent Unexamined Publication No. 59-38322 assigned to the same Assignee as the present application.

The proposed furnace will be described hereunder by reference to FIGS. 8 through 11. A furnace chamber 1 is surrounded by an upper and a lower fireproof member 2 at upper, lower and side portions thereof, and is provided at the upper portion thereof with a gas burner 3 as heating means facing to the furnace chamber 1. On the side portions of the furnace chamber 1, a work inlet 4 and a work outlet 5 are provided so as to be in close vicinity to each other. Within the furnace chamber 1, a work mount turntable 6 is provided so as to be rotatable about the vertical axis thereof and a circulating fan 7 constituted by a sirocco fan or the like is provided coaxially with the turntable 6 so as to turn about the same axis above the center portion of the turntable 6. In this case, a plurality of partition plates 8 are uprightly provided on the outer circumference of the upper surface of the turntable 6 to form a plurality of work mount portions 9 at suitable intervals. In this furnace, the work mount portions 9 are arranged in two stages, and a plurality of diffusing blades 10 are formed at the inside of and coaxially with the circular arrangement of the work mount portions 9 so as to face the circulating fan 7. A rotary shaft 11 of the turntable 6 is vertically supported at the center of a frame 12 supporting the furnace chamber 1 through the lower fireproof member 2. A driven gear 13 attached to the lower end of the rotary shaft 11 engages with a drive gear 15 attached to a rotary shaft 14*a* of an electric motor 14 disposed within the frame 12 for driving the turntable, so that the rotation of the motor 14 acting as driving means is transmitted to the turntable 6 so as to cause the turntable 6 to rotate intermittently or continuously.

On the other hand, a rotary shaft 16 supporting the circulating fan 7 passes through the upper fireproof member 2 to project upward. A transmission belt 21 is entrained about a driven pulley 17 attached to the upper end of the rotary shaft 16 and a drive pulley 20 attached to a shaft 19*a* of a circulating fan driving electric motor 19 disposed on the upper face of the upper fireproof member 2 of the furnace chamber 1 through a support member 18. The rotation of the motor 19 is transmitted to the circulating fan 7 by the pulleys 17 and 20 and the transmission belt 21. In this case, the circulating fan 7 is made to rotate at a speed higher than the turntable 6.

In the thus arranged furnace, it is desired that carrying-in of works A from the work inlet 4 and carrying-out of the same from the work outlet 5 can be performed continuously. Therefore, as shown in FIG. 10, the work inlet 4 is formed to downward incline toward the turntable 6 and an inclined portion 23 for temporarily mounting a work is formed to be connected to the work inlet 4 through an openable/closable cover 22 provided at the outer side of the work inlet 4. Moreover, at the outside of the work temporarily mounting portion 23, there is provided a swingable work supply portion 24 which is adapted to be shortened at its free end to the work temporarily mounting portion 23 by suitable operation means (not shown) so that one work A is made to stand by at the outside of the furnace chamber 1 and then made to come onto a certain one of the work mount portions 9 of the turntable 6 through the work inlet 4 by opening the cover 22. At the work outlet 5, there is provided a hook-like work carry-out bar 25 for drawing a work A out of the furnace chamber 1 in synchronism with the rotation of the turntable 6, the bar 25 adapted to be shuttled by not-shown driving means. The work outlet 5 is formed to be inclined downward outward so that a work A may be smoothly carried out to a shooter 26. Alternatively, the work carry-out bar 25 may be arranged, as shown in FIG. 11, so as to be constituted by a bar body 25*a*, an end support 25*b*, an inner support 25*c*, and a movable rod 25*d*, the supports 25*b* and 25*c* being formed to oppose to each other at the end of the bar body 25*a* and at a somewhat inner position therefrom, respectively, the movable rod 25*a* being formed so as to pass through the inner wall 25*c* movably to shuttle relative to the top wall 25*b*, thereby making it possible that a work A is held between the movable rod 25*d* and the end support 25*b*, carried out of the furnace chamber, and then released from the held state.

In the thus arranged furnace, it is possible that the air blast from the circulating fan 7 is diffused by the diffusing blades 10 so that the surface of the respective work A is heated uniformly. There is a further effect that it is possible to perform the heat treatment of the works A at a high speed in cooperation with the rotation of the turntable 6. In the thus arranged furnace, however, there remain some unsolved problems as to the way how to carry the works A into and out of the furnace. In the example as shown FIG. 10, a work A is made to slide or roll down by the use of inclination of the work inlet 4 so as to be mounted onto the turntable 6 from the work temporarily mounting portion 23. At the work outlet 5 there is provided the hook-like work carry-out bar 25 for drawing a work A out of the furnace chamber 1 into the downward inclined work outlet 5 from which the work A is made to slide or roll down to be carried out from the furnace. In the alternative example as shown in FIG. 11, a work A is slided while being held between the end of the movable rod 25*d* and the end support 25*b*.

Such a work carry-in/out system by the use of gravity and inclination of the work inlet and outlet 4 and 5 and such a system in which a work A is fallen down after carried out while being held by the work carry-out bar 25, are suitable only for works A having a shape capable of rolling easily. In the sliding carry-in system, it is necessary that the work A is finished up to have a smooth surface in some degree and there is a risk that a work A having a complex surface is injured when it is slided down. Moreover, in the system employing the work carry-out bar 25, the works are limited to those having a shape capable of being held easily and it is therefore difficult to use the system for the works A having an external shape complex or apt to be injured.

SUMMARY OF THE INVENTION

Therefore, it is an object of the present invention to provide an improved furnace in which the foregoing disadvantages of the prior art furnaces are eliminated.

It is another object of the present invention to provide a furnace having work carry-in and carry-out means for enabling works without limitation in shape thereof.

In accordance with the invention, there is provided a furnace comprising a furnace chamber surrounded by fireproof walls formed with a work inlet and a work outlet and having heating means such as a burner provided toward the inside of the furnace chamber, a work mounting turntable rotatably provided within the furnace chamber, and a circulating fan provided coaxially with the turntable, the turntable having a plurality of work mount portions formed at the outer circumferential positions thereof separately at regular angular intervals and a plurality of diffusing blades formed at inner circumferential positions inside the work mount portions coaxially with the turntable so as to face the circulating fan, whereby a gas within the furnace chamber heated by the heating means is uniformly circulated toward the work mount portions from the circulating fan through the diffusing blades, the furnace further comprising work carry-in means for carrying a work into the furnace chamber through the work inlet while mounting the work on the work carry-in means so as to transfer the work onto selected one of the work mount portions, and work carry-out means for carrying out a work mounted on specific one of the work mount portions through the work outlet while mounting the work on the work carry-out means.

In a preferred embodiment of the invention, each of the work mount portions on the turntable is constituted by a plurality of strip or plate-like members arranged at regular intervals in the tine-like form, and, similarly to this, the front end of each of the work carry-in means and the work carry-out means is constituted by a plurality of strip or plate-like members arranged at regular intervals in the tine-like form, so that the plate-like members of the work carry-in means/work carry-out means can be moved up and down while passing through the intervals of the plate-like members of the work mount portions.

According to the invention, any works can be carried in and out of the furnace chamber regardless the shape thereof as long as the works have a size which can be carried in from the work inlet, and therefore the invention is applicable to works widely. Moreover, since the carrying-in and carrying-out of the works can be made with the works mounted on the carry-in and carry-out means, the bodies and surfaces of the works are not broken or injured. Since the work mount are formed tine-like, the forcedly circulating fan can exhibit its performance sufficiently in the furnace and the transmission of heat to the works can be greatly improved. In this case, heat efficiency can be improved, since heated gases come into contact with the bottom portions of the works to thereby increase heat transmission area thereof.

The foregoing and other objects, features, and advantages of the present invention will become apparent from the detailed description of preferred embodiments in connection with the accompanying drawings.

DETAILED DESCRIPTION OF PREFERRED EMBODIMENTS

Referring to FIGS. 1 through 7, preferred embodiments of the present invention will be described in detail hereunder separately as to the structure and operations.

(A) Construction of Furnace and its Incidental Equipment

Figure 1:
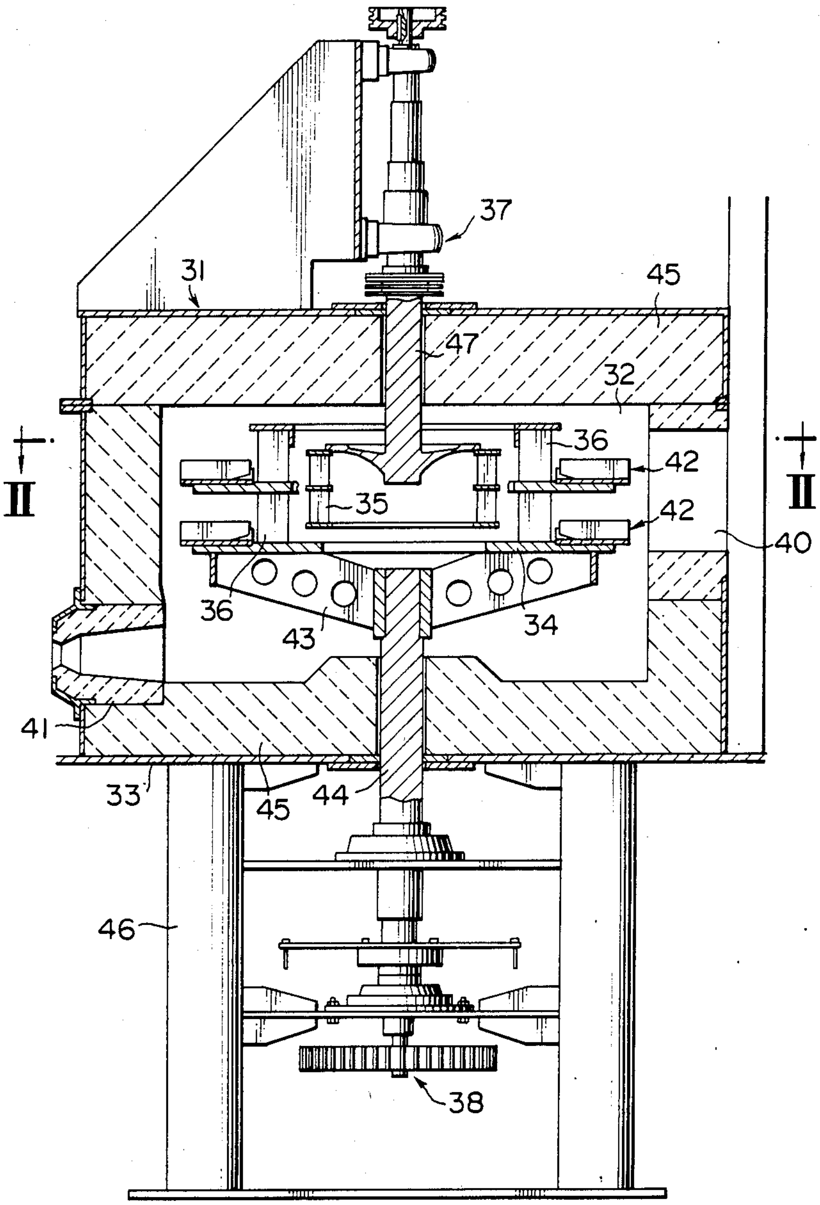
FIG. 1 is a side view, partly broken, of a furnace of an embodiment of the present invention.
Figure 2:
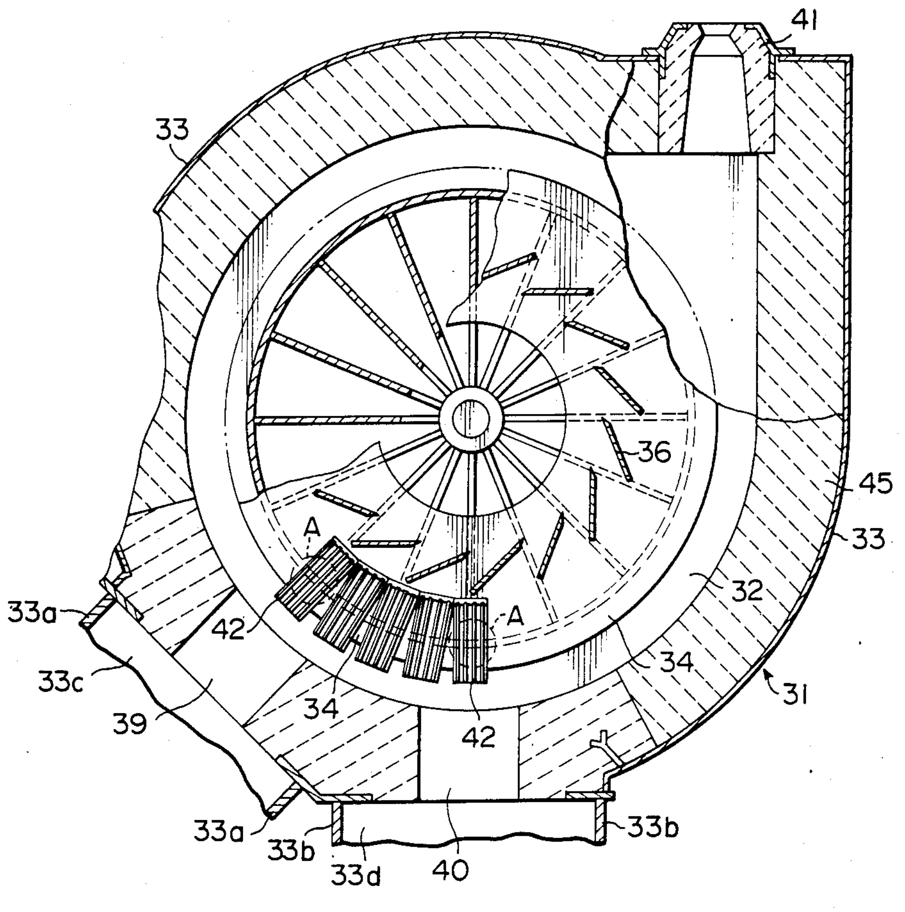
FIG. 2 is a plan, partly in section taken along line II—II of FIG. 1.

Referring to FIGS. 1 and 2, a furnace 31 has a cylindrical furnace chamber 32, a casing 33 surrounding the furnace chamber on the upper, lower, sides thereof, a work mount turntable 34 disposed within the furnace chamber 32, a circulating fan 35 for circulating heated gas within the furnace chamber 32, and diffusing blades 36 for rectifying/diffusing an air flow produced by the circulating fan 35. A circulating fan driving unit 37 including a not-shown electric motor for driving the circulating fan 35, and a turntable driving unit 38 for driving the turntable 34 are provided in the above and under portions of the casing 33 respectively. A work inlet 39, a work outlet 40, and a blowing-in nozzle 41 for introducing heated air into the furnace chamber 32 are formed in the side portions of the casing 33. The diffusing blades 36 are attached on the upper surface of the turntable 34 at the inner side thereof, and a numbers of work mounts 42 are provided on the turntable 34 at the outer circumferential portions thereof turntable 34, each mount 42 being formed tine-like by the arrangement of a plurality of plate members 42*a* separated at regular intervals. Together with the circulating fan 35 constituted by a sirocco fan or the like and provided at the above inner side of the turntable 34 coaxially with the latter, the work mounts 42 are arranged into, for example, two stages, as shown in FIG. 1. The turntable 34 is supported by a turntable support member 43 having a rotary shaft 44 vertically supported at the center of a frame 46 which supports the furnace chamber 32 through the casing 33 and fireproof members 45 provided at the inner sides of the casing 33 and having a sufficiently thickness. The turntable 34 is rotated continuously or intermittently by the turntable driving unit 38 mounted on the rotary shaft 44 at the lower end thereof, the driving unit 38 being driven by a not-shown electric motor in the same manner as the conventional case. On the other hand, a rotary shaft 47 of the circulating fan 35 is passed through the upper fireproof member 2 and casing 33 to project upward in the same manner as the prior art. The rotary shaft 47 is rotated by a not-shown electric motor connected to the circulating fan driving unit 37 constituted by a driven pulley or the like mounted on the upper portion of the rotary shaft 47, so that the circulating fan 35 can be rotated at a speed higher than the turntable 34.

An external heating unit such as a gas burner or the like is attached to the blowing-in nozzle 41 formed in the lower side portion of the furnace 31 so as to blow heated gases into the furnace chamber 32 to prepare to put the furnace chamber 32 under a predetermined temperature atmospheric condition. The work inlet 39 and work outlet 40 are formed to radially pass through the casing 33 and the fireproof member 45 at the sides of the furnace 31, at a downstream and an upperstream portion with respect to the turning direction of the turntable 34 respectively, so that a work A put on a certain one work mount 42 can be taken out after the turntable 34 has turned nearly once. The work inlet 39 and work outlet 40 are provided with furnace covers 33*c* and 33*d* which are openably and closably controlled by guide members 33*a* and 33*b* respectively.

Figure 5:
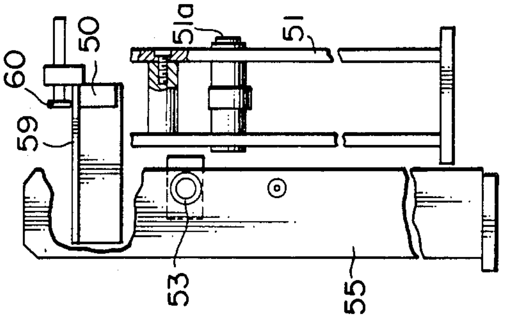
FIG. 5 is a partially cutaway right side view of FIG. 3.

Next, referring to FIGS. 3, 4, and 5, work carry-in means will be described. The work carry-in means 48 has a pair of work carry-in stands 49. Each of the work carry-in stands 49 is constituted by a plurality of plate members 49*a* separately arranged side by said at regular intervals in the form of a tine-like shape, and a carry-in member 50 connected at its forward end to the work carry-in stand 49. A carry-in member support 51 is attached to the carry-in members 50 at the respective rear ends of the latter so as to swingably support the carry-in members 50. The support 51 is horizontally movably supported on a base 52. The work carry-in means 48 further has a work push-out unit 56 which includes a pair of work push-out members 53 each for pushing out a work A onto the corresponding work carry-in stand 49, and a support 55 supporting the work push-out members 53 and being movable horizontally along a base 54. The work carry-in means 48 is positioned such that the work carry-in stands 49 are located on the horizontal extension of the work inlet 39 of the furnace 31, such that the work carry-in means can go ahead to a position where the work carry-in stands 49 enter the corresponding work mounts 42 and can come back to a position at a side of the furnace 31 where at least the opening/closing of the furnace cover 33*c* is obstructed.

Each of the work carry-in stands 49 is formed into a tine-like shape as described above and the plate members 49*a* thereof are inserted into the gaps of the similarly tine-like arranged plate members 42*a* of the corresponding one of the mounts 42 on the turntable 34, so that the stand 49 can fully enter the gaps of the mount 42 to the roots thereof when the work carry-in stand 49 is advanced.

Each of the carry-in members 50 is swingably supported at their lengthwise position of about ¼ from the rear end thereof by the carry-in member support 51, and is connected at its rear end to a lift unit 57 for moving the work carry-in stand 49 up and down about a corresponding one of fulcrums 51*a* provided on the support 51. The lift unit 57 is constituted by a reciprocally movably drive portion 57*a* provided with a pneumatically driven piston or the like, and a rod 57*b* connected at its one end to the drive portion 57*a*. The other end of the rod 57*b* engages with lower one of the carry-in members 50. The double stage carry-in members 50 are connected to each other at their respective rear ends by a connection bar 58 such that each of member 50 can pivot at is pivotal point on the connection bar 58. Although the drive portion 57*a* is pnematically driven in this embodiment, it may be, alternatively, driven by using other driving source, for example, gears, cams, cranks, or the like. A bring-in stand 59 for bringing in a work A from the side thereof is provided at the forward end of each of the carry-in member 50. A stopper 60 is provided on the side of the bring-in stand 59 to thereby limit the position of a work A brought in. Since the carry-in members 50 are formed to have double stages, upper and lower ones, corresponding to the double structure of the turntable 34, the pair of carry-in members 50 are arranged such that the respective work carry-in stands 49, bring-in stands 59, stoppers 60, etc., thereof are located at the corresponding positions to each other.

Figure 6:
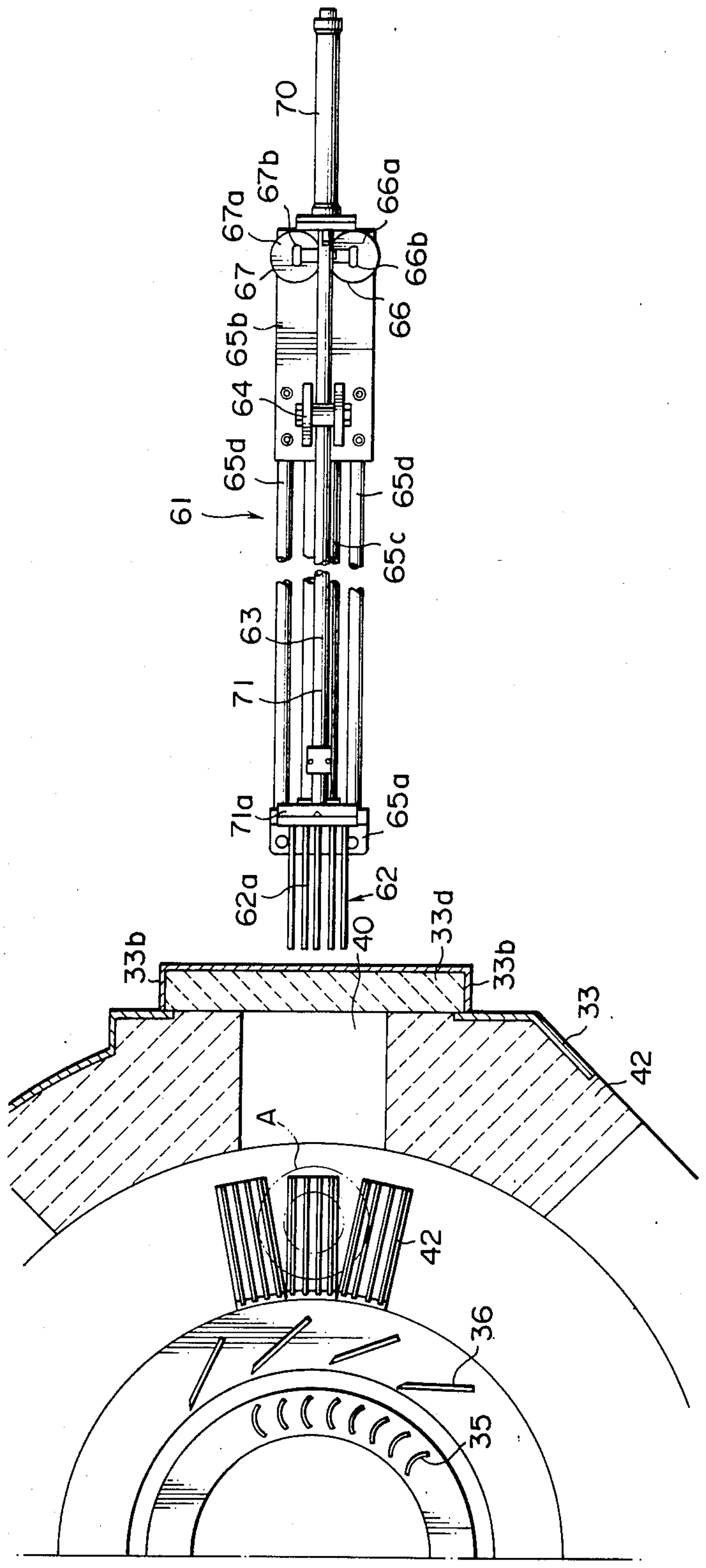
FIG. 6 is a plan view showing the relationship between the furnace and the work carry-out means.
Figure 7:
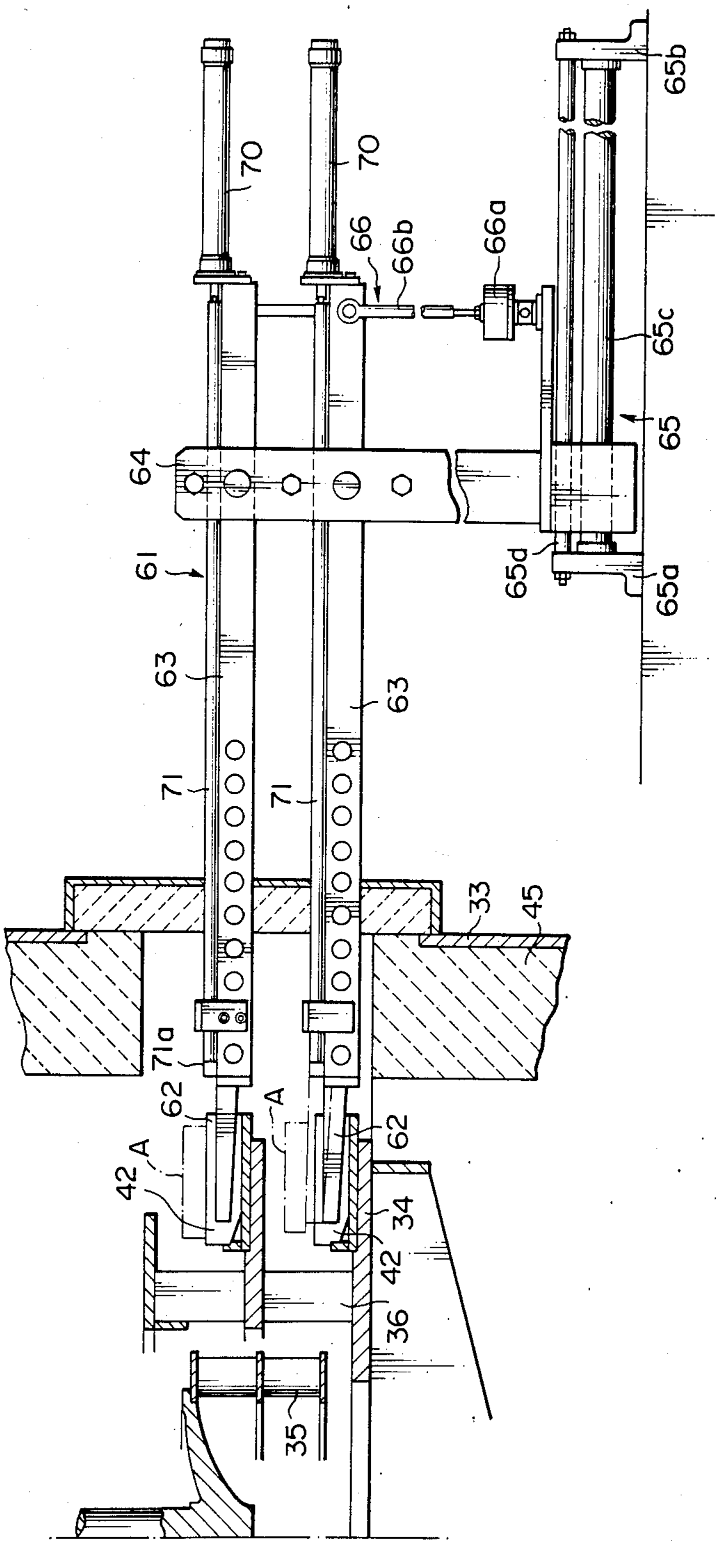
FIG. 7 is a side view of the work carry-out means of FIG. 6.
Figure 8:
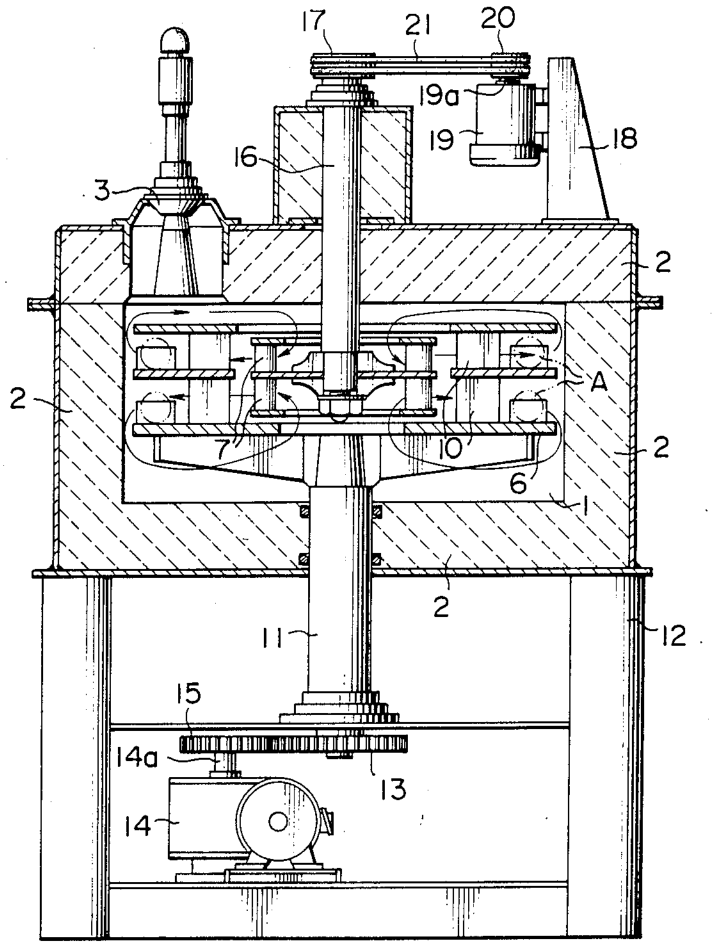
FIG. 8 PRIOR ART
FIG. 8 is a longitudinal sectional view showing an example of the prior art type furnace.
Figure 9:
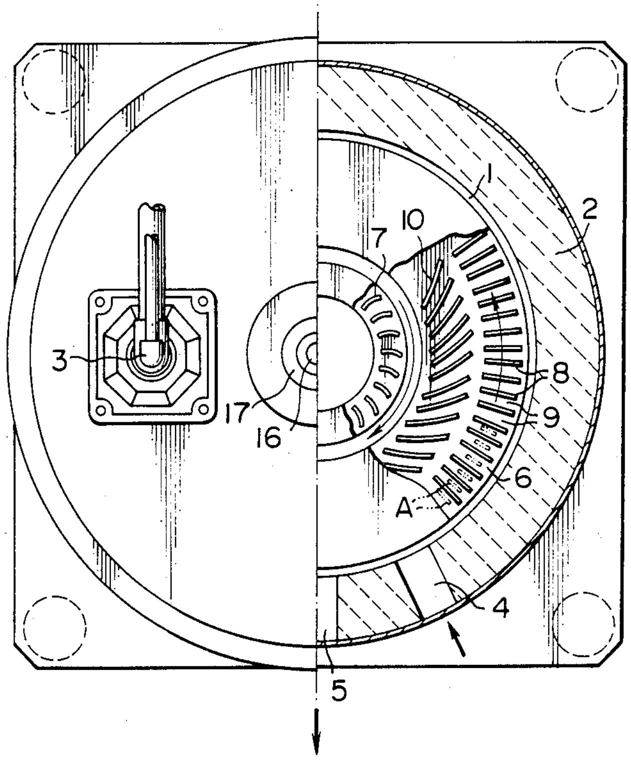
FIG. 9 PRIOR ART
FIG. 9 is a plan view, half in section, of FIG. 8.
Figure 10:
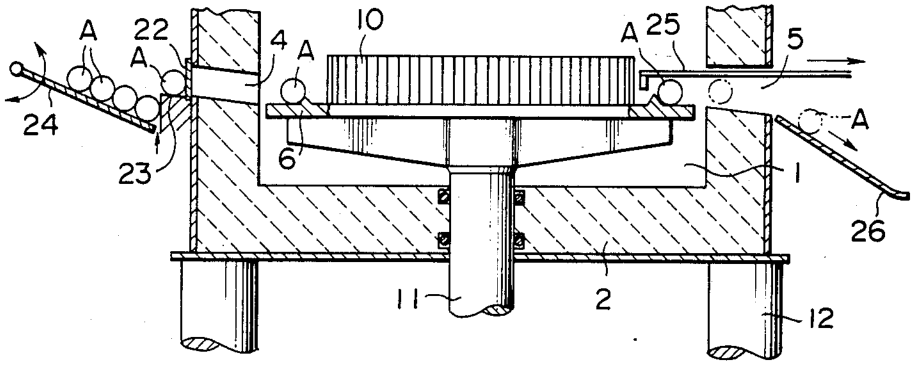
FIG. 10 PRIOR ART
FIG. 10 is a longitudinal sectional view for explaining the condition of carrying-in and carrying-out of works in the prior art.
Figure 11:
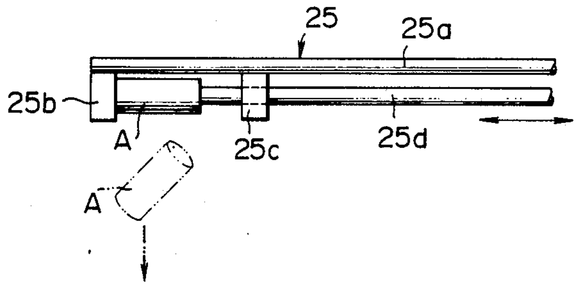
FIG. 11 PRIOR ART
FIG. 11 is a view for explaining an example of the work carry-out means in the prior art.

Next, referring to FIGS. 6 and 7, work carry-out means 61 will be described. The work carry-out means 61, similarly to the work carry-in means 48, has a pair of work carry-out stand 62 constituted in the tine-like shape by a plurality of plate members 62*a* arranged side by side at regular intervals, and a pair of carry-out members 63 connected at their respective one ends connected to the corresponding work carry-out stands 63. A carry-out member support 64 is provided at the respective mounted in the rear ends of the carry-out members 63 so as to swingably support the carry-out members 63. The support 64 is horizontally movably supported on a base 65. Lift units 66 and 67 for the work carry-out stands 62 are provided at the rear ends of the upper and lower carry-out members 63 respectively. The work carry-out means 61 is positioned on the horizontal extension of the work outlet 40 of the furnace 31, such that the work carry-out means 61 can go ahead to a position where the work carry-out stands 62 enter the gaps of corresponding work mounts 42 in the furnace chamber 32 and can come back to a position at a side of the furnace 31 where a work A taken out of the furnace chamber can be discharged to a work collection section (not shown).

Each of the work carry-out stands 62 is formed into a tine-like shape similarly to the work carry-in stands 49, and the plate members 62*a* thereof are inserted into the gaps of the similarly tine-like arranged plate members 42*a* of the corresponding one of the mounts 42 on the turntable 34, so that the stand 62 can fully enter the gaps of the mount 42 to the roots thereof when the work carry-out stand 63 is advanced.

Push-out members 71, 71 slidably moved in the horizontal direction by air cylinders 70, 70 are provided on the upper portions of the respective carry-out members 63. Each of the push-out members 71 having a forward end 71*a* which is in the rear of the work carry-out stand 62 in the normal state and is made to go ahead when a work A withdrawn onto the work carry-out stand 62 is to be fallen down, for example, into a shooter of a not-shown forging press or the like.

Similarly to the carry-in members 50, the carry-out members 63 are supported at positions of about ⅓ from the respective rear ends thereof by the carry-out member support 64, and are connected at the respective rear ends thereof to individual lift units 66 and 67 for independently causing the work carry-out stand 62 to move up/down. Similarly to the lift unit 57 of the carry-in member 50, the lift units 66 and 67 are constituted by drive portions 66*a* and 67*a*, and connection bars 66*b* and 67*b* connecting the lower and upper carry-out members 63 to the drive portions 66*a* and 67*a* respectively so as to be able to move the carry-out members 63 independently from each other.

The base 52 of the work carry-in means 52, the base 54 of the work push-out unit 56, and the base 65 of the work carry-out means 61 are substantially the same in structure and therefore these bases will be described together.

The base 52 (54 and 65) is constituted by a front support 52*a* (54*a* and 65*a*), a rear support 52*b* (54*b* and 65*b*), and an operation shaft 52*c* (54*c* and 65*c*) and two guide shaft 52*d* (54*d* and 65*d*) supported between the front and rear supports 52*a* and 52*b* (54*a* and 54*b*; and 65*a* and 65*b*). The carry-in member support 51, the support member 55 of the work push-out member 53, and the carry-out member support 64 are movable to slidably along these shafts respectively. By such a sliding operation, the work carry-in stand 49, the work push-out member 53 and the work carry-out stand 64 are caused to go ahead and come backward. Although this embodiment shows the case where the carry-in member support 51, the support member 55 of the work push-out member 53, and the carry-out member support 64 are moved along the operation shafts 52*c*, 54*c*, and 65*c* respectively by means of air pressure drive, they may be moved to and fro, alternatively, by the rotation of the respective operation shafts 52*c*, 54*c*, and 65*c* each of which is constituted by a screw shaft made of a screw rod, or they may be moved by a known hydraulic driving means. The way how to drive the carry-in member support 51, the support member 55, the carry-out member support 64, and the like, is only a matter of selection in design.

(B) Operation of Furnace and its Incidental Equipment

The operational procedure to treat the works by the use of the furnace and its incidental equipment having such a structure as described above will be described hereunder. It is assumed that the inside of the furnace chamber 32 is kept at a predetermined temperature in accordance with the purpose of heat treatment, heating, and so on.

Figure 3:
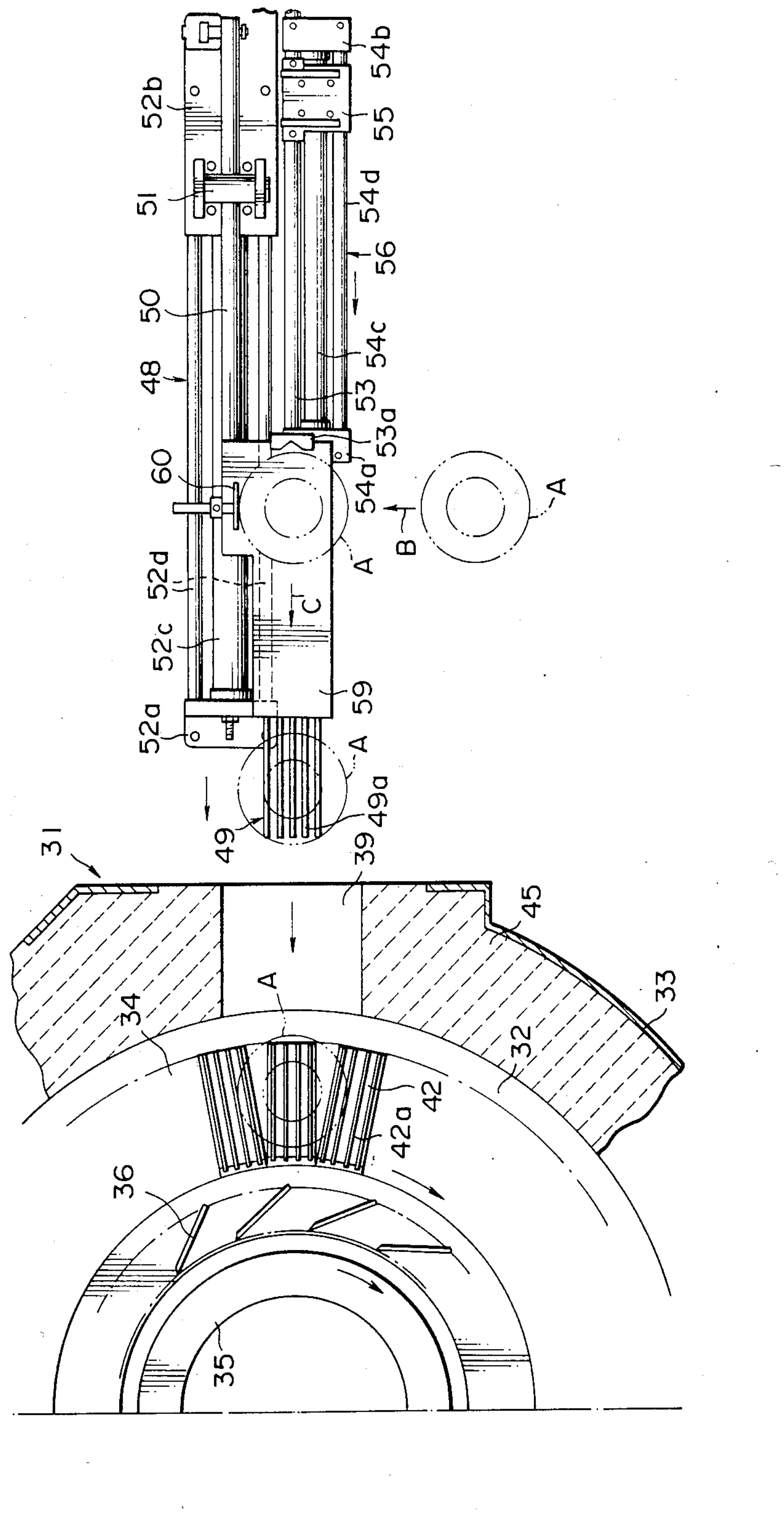
FIG. 3 is a plan view showing the relationship between the furnace and the work carry-in means.
Figure 4:
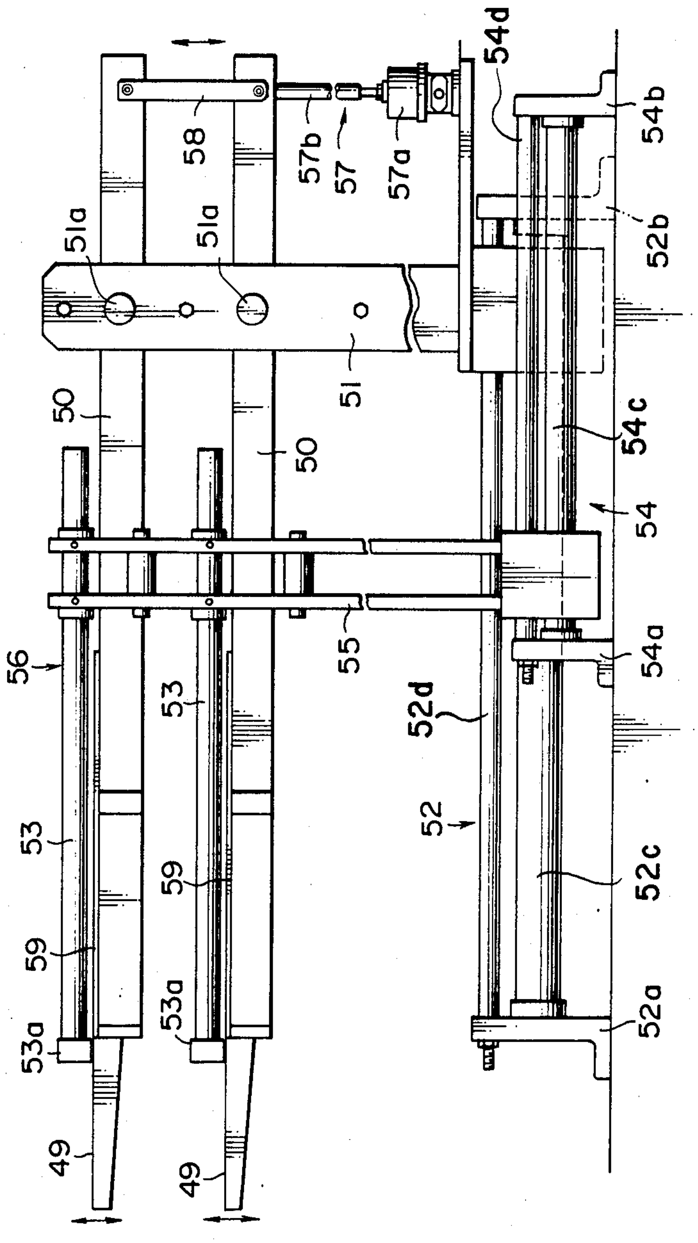
FIG. 4 is a side view of the work carry-in means of FIG. 3.

When works A are brought in the direction of the arrow B in FIG. 3 onto the respective rear portions of the work bring-in stands 59 from a work supply unit (not shown), the works A abut against the respective stoppers 60 provided on the side faces of the bring-in stands 59 and stop thereat. At this time, the work carry-in member support 51 is positioned at the rearmost end of the base 52 so that the respective work carry-in stands 49 are sufficiently apart from the work inlet 39. Moreover at this time, the lift unit 57 connected to the respective rear ends of the work carry-in members 50 draws the respective rear ends of the carry-in members 50 downward to as to keep the upper and lower work carry-in stands 49 at positions higher than the respective corresponding upper and lower work mounts 42 of the turntable 34 in the furnace chamber 32. The support 55 of the work push-out members 53 is positioned at the rearmost portion of the base 54 so that respective push-out portions 53*a* formed at the front ends of the work push-out members 53 are located at positions just back of the works A.

In such a state, if the support 55 is moved forward (leftward in FIG. 3), the respective work push-out members 53 are projected forward so as to move the works A in the direction of the arrow C in FIG. 3 on the bring-in stands 59. When the movement of the support 55 reaches the front limit, the respective upper and lower works A are transferred to the upper and lower work carry-in stands 49 from the front ends of the upper and lower bring-in stands 59. Then the carry-in member support 51 of the work carry-in means 48 moves forward (leftward in FIG. 3) toward the furnace 31, so that the upper and lower work carry-in stands 49 enter the gaps of the respective upper and lower work mounts 42 on the turntable 34 into the vicinity of the roots (attached portions) of the respective mounts 42 as described above. At that time, the upper and lower work carry-in stands 49 are located slightly higher than the respective upper and lower works mounts 42, so that the works A on the upper and lower work carry-in stands 49 are positioned just above the upper and lower work mounts 42 so as not to touch the work mounts 42. In such a state, when the lift unit 57 connected to the respective rear ends of the carry-in members 50 is operated to push up the respective rear ends of the carry-in members 50, the carry-in members 50 pivot counterclockwise about the respective fulcrums 51*a* so that the respective upper and lower work carry-in stands 49 come down and the tine-like members 49*a* of the respective upper and work carry-in stands 49 pass through gaps of the tine-like members of the respective upper and lower work mounts 42 to come to positions under the work mounts 42. At that time, the respective upper and lower works A remain on the upper and lower work mounts 42 to be mounted thereon. Thus, generally, the work carry-in operations are performed at the same time between the respective upper and lower carry-in members 50 and the corresponding upper and lower work mounts 42.

Thereafter, the support 55 of the push-out members 53 as well as the carry-in member support 51 are caused to come back so that the work carry-in stands 49 and the front ends 53*a* of the respective push-out members 53 are returned to the initial condition to wait for the next bringing-in operation of succeeding works A. On the other hand, the work mounts 42 on which the works A have been mounted in such a manner as described above are turned together with the turntable 34 by a suitable amount in accordance with the size of the works A and another pair of the work mounts become in the stand-by condition for bringing-in the next works. The carry-in operation is repeated and the works A are automatically successively carried into the furnace chamber 32.

The works A are treated at a predetermined temperature for a predetermined period of time as the turntable 34 rotates and are taken out of the furnace chamber through the work outlet 40. The work carry-out operation is performed in the reverse proceeding of the foregoing work carry-in operation and will be described briefly hereunder.

When the predetermined treatment for specific works A is completed and the specific works A come to the position facing the work outlet 40, the turntable 34 stops and the furnace cover **33*b* opens. When the furnace cover 33*b* opens, the lift units 66 and 67 respectively connected to the respective rear ends of the upper and lower carry-out members 63 are operated to cause the upper and lower carry-out member supports 62 to go ahead toward the furnace 31 with the respective upper and lower work carry-out stands 62 kept lower than the upper and lower work mounts 42 so that the respective upper and lower work carry-out stands 62 in front of the carry-out members 63 enter the furnace chamber 32. At that time, the respective upper and lower work carry-out stands 62 enter the respective gaps of the upper and lower work mounts vicinity of the roots (attached portion) of the work mount 42 slightly under the respective upper and lower work mounts so as not to touch the respective works A. Thereafter, when the lift units 66 and 67 are operated so as to push down the respective rear ends of the upper and lower carry-out members 63, the upper and lower work carry-out stands 62 come up above the respective upper and lower work mounts 42 so as to pick up the respective works A. Then, the carry-out member support 64 comes back to bring out the work carry-out stands 62 on which the works A are mounted from the furnace 31, and at the the time the respective push-out members 71 are caused to go ahead by means of respective air cylinders 70 so as to make the works A mounted on the respective work carry-out stands 62 fall down into a shooter or the like (not shown), thus completing one cycle. Although the foregoing description has been made so as to carry out two works A at the same time because of the two stage structure of the carry-out members 63, the upper and lower work carry-out stands 62 can be moved up/down not only at the same time but separately from each other because the upper and lower carry-out members 63 are separately connected to the individual lift units 66 and 67 in consideration of the case where the upper and lower works A on the respective upper and lower work mounts 42** are different in time for the necessary heat treatment.

Although the present invention has been described and illustrated in its specific embodiments, it should be appreciated by those skilled in the art that various changes in the shape and minor details of construction can be made in the embodiments without departing from the spirit and scope of the invention.

What is claimed is:

1. In a furnace comprising a furnace chamber surrounded by fireproof walls formed with a work inlet and a work outlet and having heating means such as a burner provided toward the inside of the furnace chamber, a work mounting turntable rotatably provided within said furnace chamber, and a circulating fan provided coaxially with said turntable, said turntable having a plurality of work mount portions formed at the outer circumferential positions thereof separately at regular angular intervals and a plurality of diffusing blades formed at inner circumferential positions inside said work mount portions coaxially with said turntable so as to face said circulating fan, whereby a gas within said furnace chamber heated by said heating means is uniformly circulated toward said work mount portions from said circulating fan through said diffusing blades; the improvement comprising:

work carry-in means for carrying a work into said furnace chamber through said work inlet while mounting said work on said work carry-in work means so as to to transfer said work onto a selected one of said work mount portions; and work carry-out means for carrying out a work mounted on a specific one of said work mount portions through said work outlet while mounting said work on said work carry-out means, each of said work mount portions being provided with a plurality of strip members with their respective one ends supported at the outer circumferential positions of said turntable, said strip members being separated at regular intervals, each of said work carry-in means and said work carry-out means being arranged to have its forward end constituted by a plurality of strip members separated at regular intervals so that said strip members of any one of said work mount portions can enter the respective intervals of any one of said work carry-in and work carry-out means.

2. A furnace according to claim 1, in which said work carry-in means has a lift unit for keeping said carry-in means at a position higher than the upper face of said selected one work mount portion when said work carry-in means is moved into said furnace chamber while mounting said on said work carry-in means, for lowering said carry-in means to a position lower than said selected one work mount portion to mount said work on said work mount portion, and for keeping said work carry-in means at its lowered position when said work carry-in means is moved to come out of said furnace chamber.

3. A furnace according to claim 1, in which said work carry-out means has a lift unit for keeping said carry-out means at a position lower than the upper face of said specific one work mount portion when said work carry-out means is moved into said furnace chamber in order to carry out the work mounted on said specific one work mount portion, for lifting said carry-out means to a position higher than said specific one work mount portion to mount said work on said work carry-out means, and for keeping said work carry-out means at its raised position when said work carry-out means is moved to come out of said furnace chamber while mounting said work on said work carry-out means.

4. A furnace according to claim 1, in which said work carry-in means has a lift unit for keeping said carry-in work means at a position higher than the upper face of said selected one work mount portion when said work carry-in means is moved into said furnace chamber while mounting said work on said work carry-in means, for lowering said carry-in means to a position lower than said selected one work mount portion to mount said work on said work mount portion, and for keeping said work carry-in means at its lowered position when said work carry-in means is moved to come out of said furnace chamber, said work carry-out means having a lift unit for keeping said carry-out means at a position lower than the upper face of said specific one work mount portion when said work carry-out means is moved into said furnace chamber in order to carry out the work mounted on said specific one work mount portion, for lifting said carry-out means to a position higher than said specific one work mount portion to mount said work on said work carry-out means, and for keeping said work carry-out means at its raised position when said work carry-out means is moved to come out of said furnace chamber while mounting said work on said work carry-out means.

* * * * *